United States Patent

[11] 3,537,534

[72] Inventor Clarence B. Richey
Fresno, California
[21] Appl. No. 728,012
[22] Filed May 9, 1968
[45] Patented Nov. 3, 1970
[73] Assignee Massey-Ferguson Inc.
Des Moines, Iowa
a corporation of Maryland

[54] CASTER WHEEL LOCKING AND TILTING ARRANGEMENT FOR TURNOVER PLOWS
8 Claims, 4 Drawing Figs.
[52] U.S. Cl. ............................................. 172/212, 172/291
[51] Int. Cl. ............................................. A01b 3/28
[50] Field of Search .................................. 172/212, 223, 227, 282, 283, 284, 285, 288, 291

[56] References Cited
UNITED STATES PATENTS
376,535  1/1888  Lynch ......................... 172/291
1,068,369  7/1913  Shaw .......................... 172/291X
3,174,556  3/1965  Knapp et al. ................. 172/212

FOREIGN PATENTS
214,185  8/1960  Austria ........................ 172/212
1,051,487  1/1954  France ......................... 172/212

Primary Examiner—Robert E. Pulfrey
Assistant Examiner—James W. Peterson
Attorney—Gerhardt, Greenlee and Farris ABSTRACT: A turnover plow including a draft frame member having a caster wheel supporting its trailing end with a plow frame mounted on the draft frame member for rotation between opposite plowing positions and a transport position. Locking means is carried by the plow frame to directionally lock the caster wheel in a steering position to steer the trailing end of the plow to one side of the longitudinal axis of the draft vehicle in accordance with the forces acting on the plow bottoms. A cam mechanism interconnects the caster wheel and plow frame to cause the caster wheel to tilt to an inclined position relative to the ground during plowing so as to counteract transverse soil forces acting on the plow bottoms. When the plows are in their transport position, the caster wheel is automatically returned to a vertical position relative to the ground and is free to caster.

INVENTOR.
CLARENCE B. RICHEY
BY Tweedale & Gerhardt
ATTORNEYS.

3,537,534

1

CASTER WHEEL LOCKING AND TILTING ARRANGEMENT FOR TURNOVER PLOWS

BACKGROUND OF THE INVENTION

1. Field of the Invention

This invention relates generally to semimounted plows having earthworking and transport positions, and is particularly concerned with providing such plows with a wheel for supporting the trailing end that can caster in the transport position of the plows but which is directionally locked and tilted in the plowing position to both steer and counteract the side forces acting on the plow bottoms.

2. Description of the Prior Art

My copending U.S. application Ser. No. 653,545 filed July 14, 1967, now U.S. Pat. No. 3,527,306 and entitled, "Semimounted Plow With Rear Caster Wheels", the entire disclosure of which is incorporated herein by reference, discloses a two-way turnover plow wherein the trailing end of the main draft frame member is supported on a caster wheel. When the plow is actuated to a plowing position such that soil forces tend to move the plow frame to an offset position to one side of the tractor longitudinal axis, a locking member on the plow frame engages a control arm to directionally lock the caster wheel in a position relative to the plow frame to steer the trailing end of the plow frame to the offset position.

In my copending U.S. application, Ser. No. 727,963 filed concurrently herewith entitled, "Semimounted Plow With Caster Wheel That Can Be Tilted And Locked For Plowing", the entire disclosure of which is incorporated herein by reference, a turnover plow is disclosed wherein the caster wheel is mounted on a torsion bar which normally maintains the caster wheel in a vertical plane relative to the ground. However, when the plow is moved to either of its plowing positions, a locking member engages a control arm to directionally lock the caster wheel in a position relative to the plow frame to steer the trailing end of the plow frame to an offset position relative to the tractor longitudinal axis, and at the same time tilts the wheel to an inclined position to counteract transverse soil forces acting on the plow bottoms.

An object of this invention is to provide a semimounted, two-way turnover plow having its trailing end supported by a caster wheel wherein a plow frame carries a locking member for directionally locking the caster wheel in a plowing position, and wherein a cam mechanism interconnects the caster wheel assembly with the plow frame to tilt the wheel to an inclined position relative to the ground during plowing and to maintain it in an upright or vertical plane relative to the ground during transport.

SUMMARY OF THE INVENTION

In accordance with the present invention, the plow frame is rotatably mounted on an elongated draft frame member supported at its trailing end by a caster wheel assembly. The plow bottoms are supported on a beam extending diagonally across the axis of the draft frame member and secured to the sleeve. Mounted on the trailing end of the beam is a locking assembly which is so positioned that when the plow bottoms are in either plowing position, the caster wheel is directionally locked. A cam mechanism interconnects the sleeve on which the caster wheel assembly is mounted with the plow frame sleeve to cause the wheel to tilt in opposite directions during left and right-hand plowing, and to remain in a vertical position during transport.

The objects, advantages and features of the invention will become apparent from the following description taken in connection with the accompanying drawings in which:

FIG. 4 is a view taken along lines 4-4 of FIG. 1.

2

Figure 1:
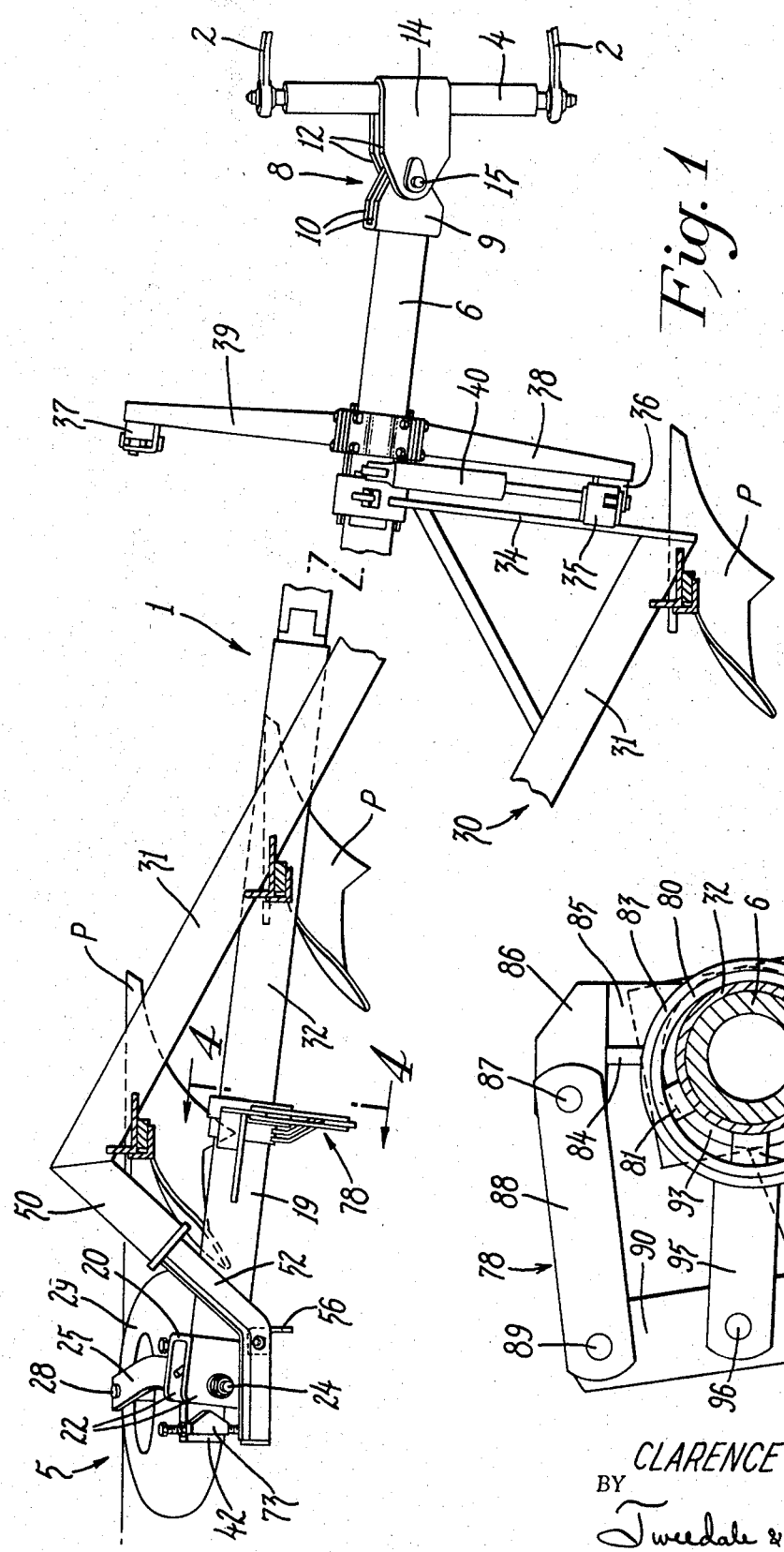
FIG. 1 is a plan view of a turnover plow embodying the invention in its preferred form.

With reference to FIG. 1, the implement is designated collectively by reference numeral 1 and is connected at is its forward end with a crossbar 4 mounted between the trailing ends of the lower draft links 2 of a conventional three-point hydraulic hitch from a tractor (not shown). The rear end of implement 1 is supported on a caster wheel assembly 5.

Implement 1 includes a frame comprising an elongated draft frame member 6, preferably of tubular construction, on which is mounted a forward connecting assembly 8 including a C-shaped bracket 9 having vertically spaced arms 10. Arms 10 of bracket 9 are received between the ends of a pair of vertically spaced arms 12 of a frame member 14 mounted on crossbar 4. Arms 10 and 12 are pivotally connected together by a pin 15 carried by arms 12.

Figure 2:
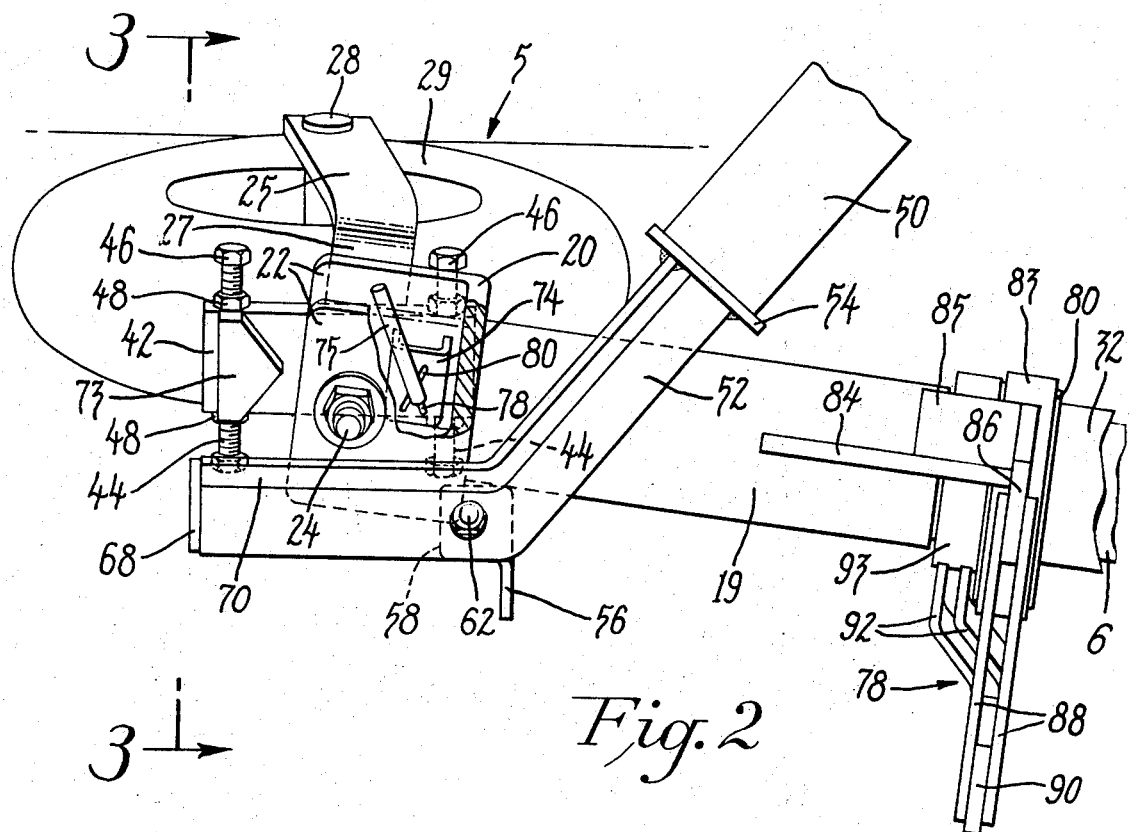
FIG. 2 is an enlarged plan view of the trailing end of the plow of FIG. 1.
Figure 3:
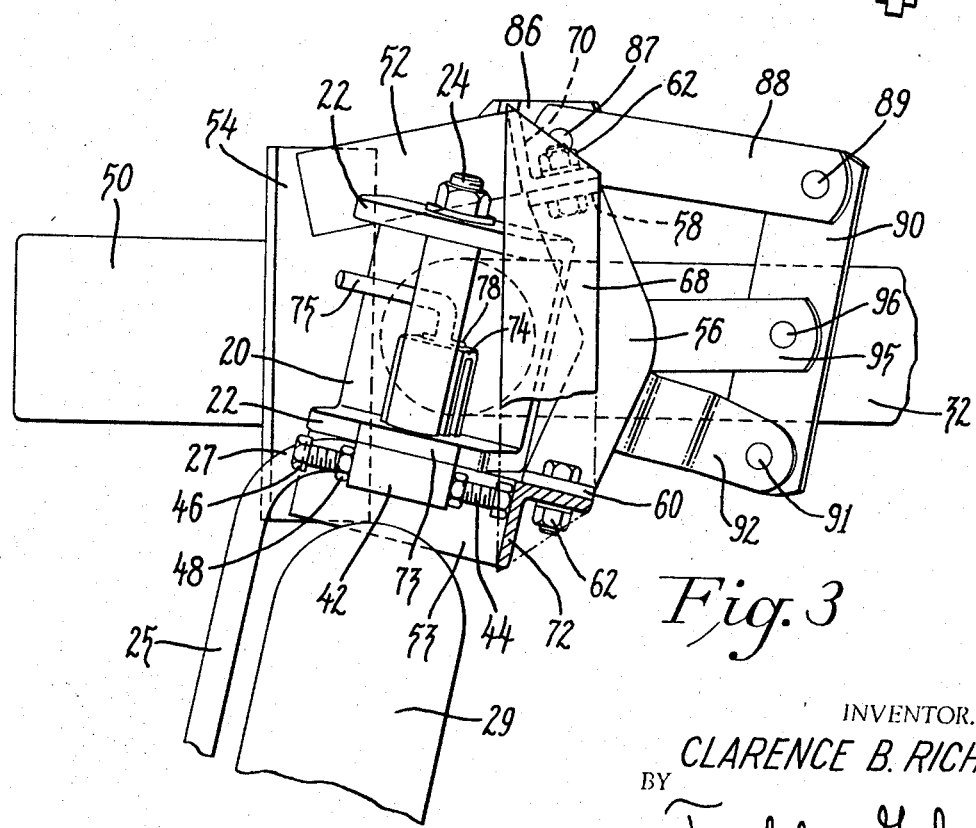
FIG. 3 is a view taken along lines 3-3 of FIG. 2.

With reference primarily to FIGS. 2 and 3, the caster wheel assembly 5 is mounted on a bracket 20 secured to the end of a wheel supporting sleeve 19 retatably mounted on draft frame member 6. Bracket 20 is formed with vertically spaced, rearwardly projecting arms 22. The shaft 28 of a ground engaging castor wheel 29 is mounted on an arm 25 having an upper horizontal end portion 27 mounted on the frame so as to be rotatable about the axis of a spindle 24. Spindle 24 is mounted between arms 22 of bracket 20. As shown in FIG. 2, arm 25 is bent rearwardly slightly from the end portion 27 to obtain a proper castering action.

The plow bottoms P, only the right-hand plow bottoms being visible in the drawings, are supported on a plow frame 30 including a diagonal beam 31 which is secured intermediate its ends to a plow frame sleeve 32 rotatably mounted on draft frame member 6. The forward end of beam 31 is secured to one end of a transverse frame member 34 which carries a locking member 35. Oppositely projecting arms 38 and 39 carry latching members 36 and 37, respectively, which are alternately engageable by a locking member 35. Locking member 35 is actuated by a hydraulic ram 40 which actuates the plow frame to rotate about the axis of draft frame member 6 between its alternate left and right-hand plow positions and transport position in a manner more fully disclosed in my copending application Ser. No. 533,816, filed Mar. 4, 1966, entitled, "Turnover Plow", the entire disclosure of which is incorporated herein by reference. Since the turnover mechanism 35, 36, 37, 38, 39, 40, etc., forms no part of the present invention, reference may be had to the latter referred to application for a detailed description of one suitable arrangement.

Again referring to FIGS. 2 and 3, a control arm 42 is mounted on the upper, horizontal end portion 27 of the wheel support arm 25 so as to rotate with arm 25 about the axis of spindle 24 which may be referred to as the "turning" or "swivel" axis of the caster wheel. As shown in FIG. 2, control arm 42 extends on both sides of the axis of spindle 24. Adjustable abutments in the form of setscrews 44 and 46 are mounted on opposite sides of control arm 42 at the ends thereof, and may be locked in position by lock nuts 48.

Mounted on the trailing end of beam 31 is an extension member 50 that projects inwardly across the longitudinal axis of draft frame member 6. A pair of spaced support arms 52 and 53 are welded onto a plate 54 mounted on the end of the extension member 50. A gusset member 56 is bolted between support arms 52 and 53 being provided with rearwardly projecting, apertured lugs 58 and 60 (FIG. 3) which receive bolt and nut assemblies 62 for securing angles 52 and 53 to the gusset 56. The outer ends of angles 52 and 53 are secured together by an end plate 68.

Angles 52 and 53 have outwardly projecting flanges 70 and 72, respectively, which as indicated in FIG. 3, may respectively engage abutments 44 and 46. A wedge-shaped stop block 73 is mounted on the upper surface of control arm 42 to limit the castering angle of the wheel so that flanges 70 and 72 can make contact with the adjustable stops 44 and 46 when the plows are rotated to a new operating position and adjust the wheel 29 to a new directional position.

In the position shown in FIGS. 1, 2 and 3, the right-hand plow bottoms are in their earthworking position and flange 72 of angle 53 engages stops 44 and prevents wheel 29 from swiveling around the axis of spindle 24. Moreover, flange 72 is disposed such that with setscrews 44 adjusted as shown in FIG. 3, wheel 29 is turned at a lead angle relative to the draft frame member 6 such that it steers the trailing end of the draft frame 6 to the left of the tractor longitudinal axis to the position shown in FIG. 1, in which position the plows are urged by the soil forces.

Movement of the plows to their transport position causes the angles 52 and 53 to rotate in a counterclockwise direction through an angle of 90° from its FIG. 3 position, and the caster wheel assembly is free to caster about the axis of spindle 24. Upon further rotation of the frame sleeve to a position of 180° counterclockwise from that shown in the drawings to place the left-hand plow bottoms in their earthworking position, the locking flange 70 on angle section 52 engages setscrews 46 causing wheel 29 to turn in an opposite direction to an angular position relative to the longitudinal axis of draft frame member 6 to steer the draft frame to the right-hand side of the tractor longitudinal axis.

A U-shaped bracket 74 is mounted on the lower arm 22 of bracket 20 for receiving a latch pin 75 which, when rotated to the position shown in FIGS. 2 and 3, disengages a pin 78 from a slot 80 and prevents pin 75 from projecting through an opening in flange 22 to engage a corresponding opening in control arm 42. When latch pin 75 is rotated clockwise in FIG. 2 to permit pin 78 to engage slot 80, control arm 42 can be locked in line with draft frame member 6 with the plow bottom in transport position for backing and maneuvering the tractor-implement combination.

Wheel tilting mechanism 78 is provided for tilting wheel 29 to either of its opposite tilted furrow wheel positions or its vertical transport position in response to rotation of the plow frame about the longitudinal axis of draft frame member 6. The tilting mechanism designated generally by reference numeral 78 is shown in detail in FIG. 4, and includes an eccentric 80 mounted on the plow frame sleeve 32 by a plurality of radial spacers 81 of varying lengths. Concentrically mounted on eccentric 80 is a collar 83. A lever 86 is connected with the wheel supporting sleeve 19 by a lever arm 84 and a brace member 85. Lever arm 84 and brace member 85 are mounted on sleeve 19 and accordingly, rotation of lever 86 about the axis of draft frame member 6 causes corresponding rotation of sleeve 19. Lever 86 is pivotally connected to one end of a double link 88 by a pin 87, and the other end of link 88 is pivotally connected by a pin 89 with one end of a lever 90. Lever 90 has its other end pivotally connected by a pin 91 with a double arm member 92 which is mounted on and projects radially from a cylinder spacer 93 which in turn is nonrotatably secured to draft frame member 6 by a setscrew or other conventional means. Projecting radially from collar 83 is an actuating arm 95 having its outer end pivotally connected by a pin 96 with lever 90 intermediate its ends.

Arm 92 is held stationary with respect to sleeve 32 due to its connection with spacer 93; hence lever 90 can only move pivotally about pin 91. Since collar 83 is connected with lever 90 through actuating arm 95, the collar 83 cannot rotate with eccentric 80. Therefore, rotation of sleeve 32 to an angle of 180° from the position of FIG. 4 causes eccentric 80 to rotate within collar 83 resulting in collar 83 shifting transversely to the right as viewed in FIG. 4. The latter movement causes actuating arm 95 to shift to the right and pivot lever 90 in a clockwise direction about pin 91, which movement is transmitted through link 88 to lever 86 causing corresponding clockwise rotation of sleeve 19 to shift wheel 29 about the axis of draft frame member 6 from the position shown in FIG. 4 to an inclined position on the opposite side of the axis of the draft frame member. Moreover, rotation of sleeve 32 through an angle of 90° from the position of FIG. 4 causes collar 83 to shift to an intermediate position causing actuating arm 95 to shift wheel 29 to its vertical, transport position. The tilting mechanism described herein above is fully disclosed and described in my copending application Ser. No. 524,191, filed Feb. 1, 1966 and entitled, "Semimounted Earthworking Implement", the entire disclosure of which is incorporated herein by reference.

While a specific form of the invention has been illustrated and described in the foregoing specification and accompanying drawings, it should be understood that the invention is not limited to the exact construction and arrangement shown, but that various alternatives and equivalents in the structure and arrangement of parts will be apparent to those skilled in the art, all of which fall within the scope and spirit of the invention.

I claim:

1. A semimounted, turnover plow including a draft frame member having forward connecting means for supporting the forward end of the draft frame member on a draft vehicle; a caster wheel assembly supporting the trailing end of the draft frame member; a plow frame sleeve rotatably mounted on the draft frame member; a beam secured intermediate its ends to said frame sleeve with the ends projecting on opposite sides of said plow frame sleeve; a plurality of oppositely projecting left and right-hand plow bottoms mounted on said beam along the length thereof for movement upon rotation of the plow frame sleeve about the draft frame member between a right-hand plowing position in which the right-hand plow bottoms only are in ground engaging position, a transport position in which the right-hand and left-hand plow bottoms are in nonground engaging positions, and a left-hand plowing position in which the left-hand plow bottoms only are in ground engaging position; wheel tilting means interconnecting the plow frame sleeve with the caster wheel assembly operable in response to movement of the plow bottoms to the right and left-hand plowing positions to move the caster wheel to right and left-hand inclined positions, respectively, to resist transverse soil forces on the plow bottoms, and operable in response to movement of the plow bottoms to the transport position to move the caster wheel to the vertical position; and locking means carried by said beam engageable with the caster wheel assembly in the right and left-hand plowing positions of the plow bottoms to directionally lock the tilted caster wheel in a position relative to the draft frame member to steer the trailing end of the draft frame member to right and left-hand offset positions, respectively, relative to the longitudinal axis of the draft vehicle such that the draft frame member trails at an angle relative thereto during plowing.

2. A semimounted, turnover plow as claimed in claim 1 wherein said beam extends diagonally with respect to the draft frame member and said locking means is carried by the trailing end of the beam.

3. A semimounted turnover plow as claimed in claim 2 including an extension on the trailing end of the beam projecting from said trailing end to the opposite side of the draft frame member, said locking means being carried by the end of said extension member.

4. A semimounted earthworking implement as claimed in claim 3 further including adjustment means on said caster wheel assembly for selectively adjusting the direction in which the caster wheel assembly is locked by said locking means.

5. A semimounted earthworking implement as claimed in claim 4 further including a control arm on said caster wheel assembly; and wherein said locking means engages said control arm to directionally lock the caster wheel assembly upon movement of the plow frame to the earthworking position.

6. A semimounted earthworking implement as claimed in claim 5 wherein said control arm is rotatable about the steering axis of the caster wheel assembly, and the steering axis passes through the control arm intermediate its ends; and wherein said locking means includes a flange engageable with the control arm on both sides of the steering axis to directionally lock the caster wheel assembly.

7. A semimounted earthworking implement as claimed in claim 6 further including adjustable abutments on said control arm engageable by said flange for selectively adjusting the locked direction of the caster wheel assembly.

8. The construction defined in claim 1 wherein said caster wheel assembly includes a wheel supporting sleeve rotatably mounted on said draft frame member, and said wheel tilting means includes a circular eccentric mounted on said plow frame sleeve for rotation therewith, a collar concentrically mounted on said eccentric for relative rotation, a wheel tilting lever projecting from said wheel supporting sleeve, a restraining arm mounted on said draft frame member, a shifting lever pivotally connected at one end with said restraining arm, an actuating arm projecting radially from said collar whereby relative rotation between said eccentric and collar causes radial reciprocable movement of said actuating arm, said actuating arm being pivotally connected with said shifting lever to cause pivotal movement of said shifting lever with respect to said restraining arm in response to relative rotation between said eccentric and collar, and a link having its ends pivotally connected with said shifting lever and tilting lever to cause rotation of said wheel supporting sleeve on said draft frame member in response to rotation of said frame sleeve in accordance with the transverse displacement of said collar caused by the resulting rotation of said eccentric to tilt said wheel assembly relative to the draft frame member in accordance with the rotary position of the frame sleeve on said draft frame member.